Patented Mar. 1, 1932

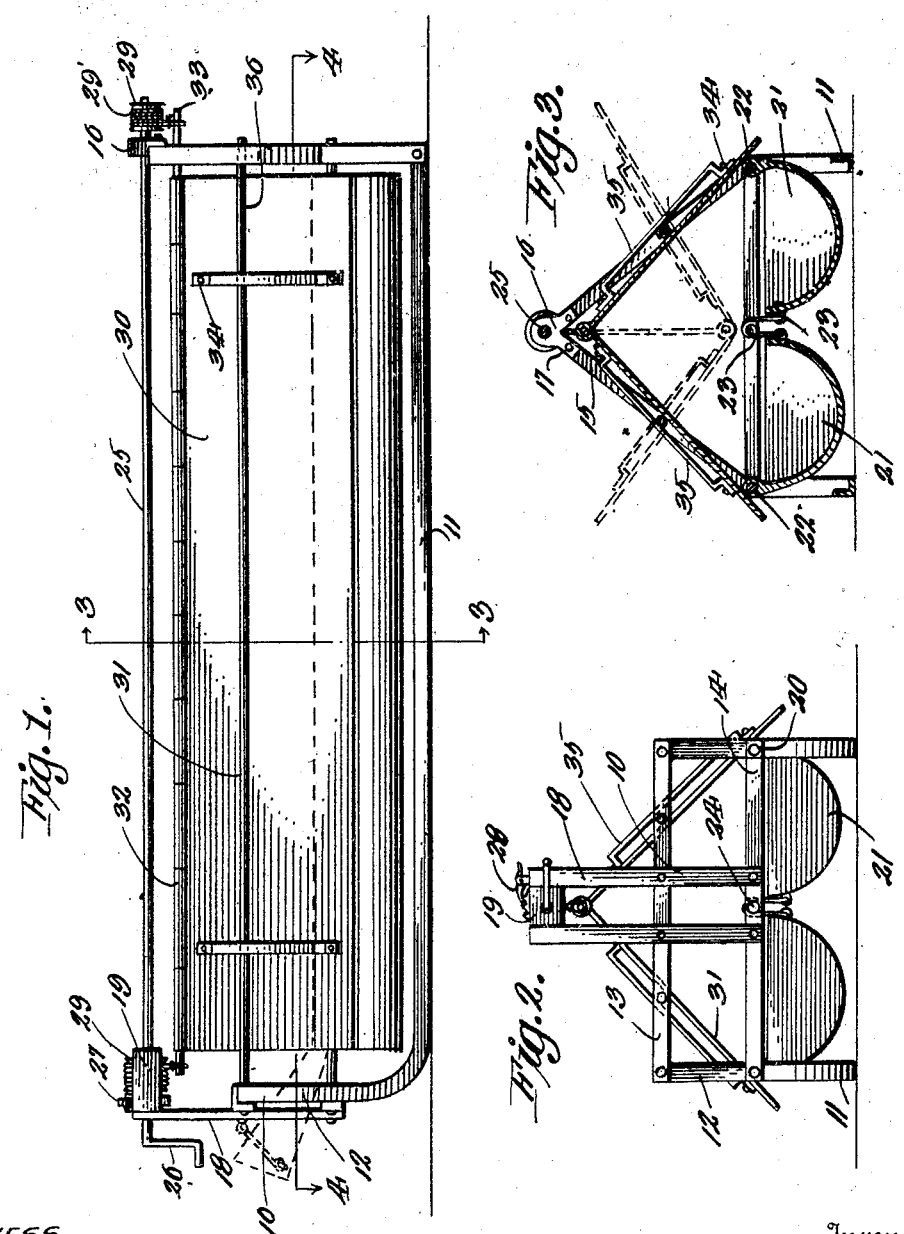

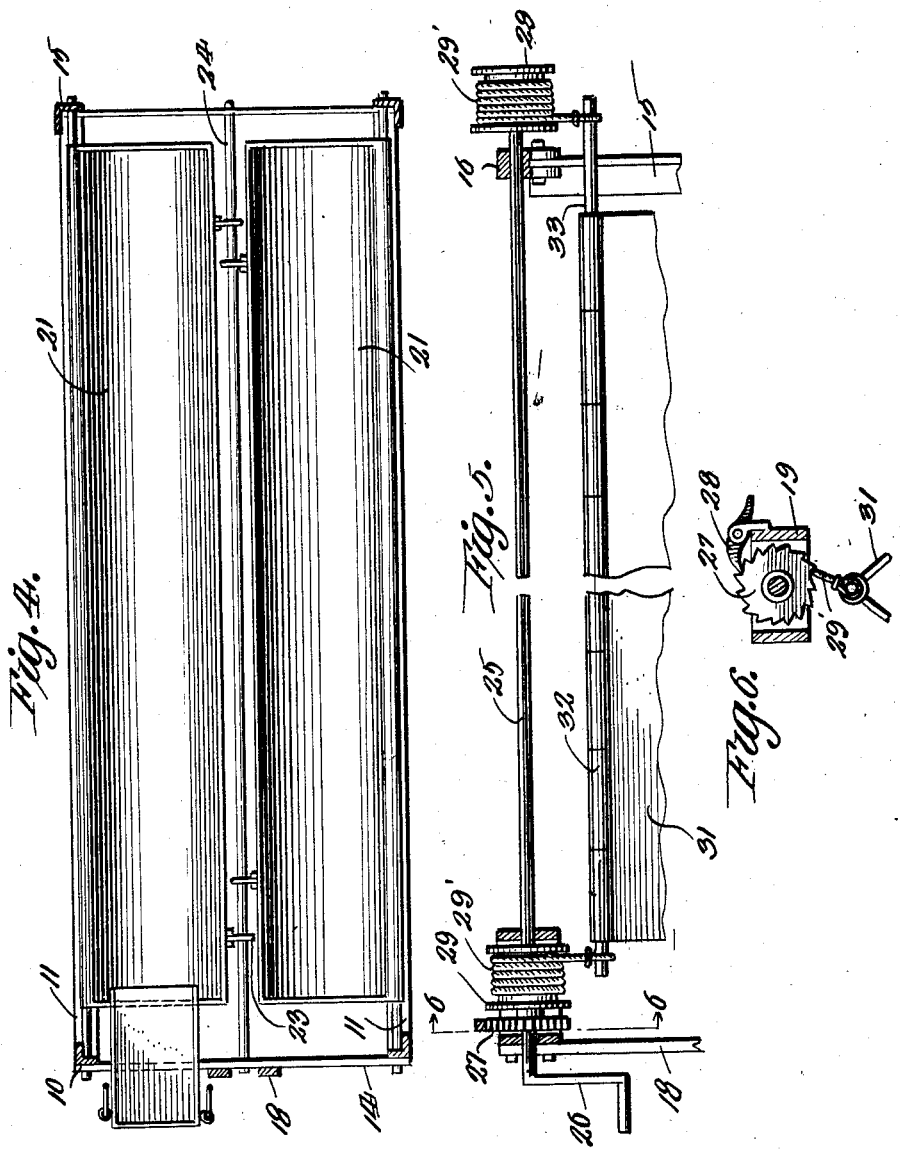

1,847,351

UNITED STATES PATENT OFFICE

CLYDE J. McCAUGHEY, OF BUCYRUS, OHIO, ASSIGNOR OF ONE-HALF TO R. F. CHRISTY, OF BUCYRUS, OHIO

FEED TROUGH

Application filed August 1, 1927, Serial No. 209,947. Renewed January 17, 1931.

The present invention relates to improvements in feed troughs for hogs, sheep, and other live stock, and has for its primary object to provide a feed trough which will be durable and comparatively simple in construction, efficient for the purpose intended, and which can be manufactured at a comparatively low cost.

A further object of the invention is the provision of a feed trough which can be quickly covered to prevent the access of rain or dirt into the food holding compartment.

Another object of the invention is the provision of a feed trough which can be conveniently opened to permit cleaning of the trough and designed to prevent the animals from climbing into the food compartment.

Another object of the invention is the provision of a feed trough of the above character, which is designed to permit rapid and convenient dumping of the excess food matter.

Other objects and advantages of the invention will become apparent as the description progresses.

In the drawings, forming a part of this application, and wherein like characters of reference denote corresponding parts throughout the several views, Figure 1 is a side elevational view of a feed trough constructed in accordance with my invention, Figure 2 is a front elevational view of the same, Figure 3 is a transverse sectional view taken on the line 3—3 of Figure 1, Figure 4 is a top plan view illustrating the position of the food holding compartments, Figure 5 is an enlarged longitudinal sectional view through the operating mechanism, and Figure 6 is a vertical transverse sectional view taken on the line 6—6 of Figure 5.

Referring now more in detail to the accompanying drawings, wherein for the purpose of illustration has been disclosed the preferred embodiment of the present invention, the numeral 10 generally indicates a support frame composed of a pair of parallel support members 11 extending longitudinally and having vertical extensions 12 formed at their forward ends to provide ground engaging runners. These runners are preferably constructed of a pair of angle irons attached at their forward ends as plainly indicated in Figure 1, to facilitate the movement of the structure. Secured to the upper ends of the vertical extensions 12 and extending transversely therebetween is a forward frame bar 13, a second frame bar 14 being disposed in parallel position immediately below the bar 13 and also secured to the vertical extensions 12 of the runners. The rear ends of the runners are secured to a pair of angular support bars 15, having their lower portions extending in vertical parallel positions while their upper portions are formed to converge toward their upper ends. The upper converging ends of the bars 15 support a bearing collar 16 having a pair of diverging blades 17 riveted or otherwise secured to the support bars 15. Riveted or otherwise secured to the central portions of the parallel bars 13 and 14, and projecting upwardly therefrom in vertical positions, are a pair of braces 18 arranged in spaced position and supporting a rectangular-shaped support frame 19 at their upper ends. With particular reference to Figure 1 it will be noted that the support frame 19 is disposed in a longitudinally aligned position with the bearing collar 16 and the end plates of the support frames are apertured in alignment with the apertures in the collar.

A pair of horizontal longitudinally extending rods 20 extend from the forward vertical extensions 12 to the rear support bars 15, these rods being rigidly fixed in the supports and adapted to pivotally support the outer sides of a pair of feed troughs 21.

These troughs are of generally semi-spherical formation enclosed at the ends by semicircular end plates and their outer upper edges are formed with tubular beads 22, through which the rods 20 are projected. The inner adjacent edges of the troughs carry hingedly connected hooks 23 adapted to engage a central longitudinal support rod 24 extending between and secured to the transverse bars of the frame. With this construction, it will be noted that the troughs 21 may be swung about the rod 22 so as to quickly and conveniently empty the same.

A longitudinal shaft 25 extends through the bearing collar 16 and the forward support frame 19 and carries an actuating crank 26 on its forward end. Fixed upon the forward end of the shaft 25 adjacent the forward frame braces 18 is a ratchet wheel 27, engageable by a pivoted pawl 28. Secured to the shaft adjacent the ratchet wheel 27 is a winding drum 29, a similar drum being secured upon the rear end of the shaft. A flexible cable is secured to each of the drums adapted to be wound thereon upon rotation of the shaft.

With particular reference to Figures 1 and 2, it will be noted that a cover 30 is arranged over the troughs, this cover being composed of a pair of hingedly connected cover sections 31 provided with pinion sleeves 32 at their adjacent meeting edges arranged for intermitting relation. A longitudinal rod 33 is fitted through the sleeves 32 of the cover sections so as to hingedly connect the same.

As illustrated in Figures 1 and 5, the lower ends of the cable 29′ are secured to the outward projections of the shaft 33 so that by rotatable operation of the shaft 25 the hingedly connected ends of the cover may be raised or lowered. In this connection, it will be noted that the cover sections 31 are provided with a pair of transversely mounted brackets 34, provided with U-shaped offset portions 35 formed at the intermediate portion of each bracket. A pair of guide rods 36 are rigidly mounted on the frame, the forward ends of the guide rods being secured in the forward transverse bar 13 and the rear ends secured in the diverging frame bars 15. These guide bars 36 extend through the offset portions of the brackets, and as its inner hinged edges of the cover are raised or lowered, will guide the outer edges of the cover sections in opposite positions.

Hence, the semi-cylindrical troughs 21 are initially filled and the entire trough structures readily drawn to any desired position. These troughs may be conveniently filled by providing tiltable chutes, as indicated by dotted lines in Figure 1 to expedite the filling thereof.

Normally, the troughs are maintained in a covered position to protect the same from rain and dirt by maintaining the cover sections in downwardly inclined positions in V-shaped formation as clearly illustrated in Figure 2. When it is desired to permit the stock to feed from the troughs, the pawl 28 is swung into elevated position so as to release the ratchet wheel 27, whereupon the weight of the rod 33 will cause the central portion of the cover to drop downwardly so that the inner hingedly connected edges of the cover will be disposed in lowered positon and the outer edges elevated. Thus, the cover sections will assume upwardly extending angular positions as shown in dotted lines in Figure 3, whereby the cattle may conveniently feed from the troughs. The position of the cover sections is such that the animals cannot climb into the trough so as to foul the feed, or remove the same therefrom. When the stock has been sufficiently fed, the troughs are again covered by rotatable operation of the crank 26. Thus, rotation of the crank will cause similar rotation of the shaft 25 and lifting cables 29. The cable will be wound upon the drums 30 so as to elevate the rod 33 and the central portion of the cover 30. The cover sections will then assume their initial positions so as to enclose the trough and protect the same.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. A stock feeding device including a rigid support frame including ground runners, a pair of longitudinally positioned feed troughs mounted in the frame and adapted for outward swinging movement therein, a cover including a pair of hingedly connected sections, a longitudinal rod for connecting said cover sections, a pair of transverse brackets secured to the outer sides of the cover sections having offset intermediate portions, a pair of rigid longitudinally connected rods extending through the said brackets, a shaft rotatably mounted in an elevated position on the support frame for rotary movement, a pair of winding drums fixed upon the shaft, flexible cables secured to the drums to be wound thereon, the lower ends of the cables being secured to the outer ends of the cover hinge rod for elevation of the same, means for locking the shaft in position to maintain the cover sections in downwardly inclined closed position.

2. In a feed trough, a pair of relatively long trough bodies arranged in side by side relation, a frame structure at each end of said troughs, a pair of cover elements each overlying and extending longitudinally of a trough, a hinge connection between the inner adjacent edges of said elements, said hinged edges being normally maintained in a plane above the outer longitudinal edges of the elements, to maintain the elements in inclined position over the troughs, a pivotal sliding connection between said frames and each of said elements, whereby upon the lowering of the hingedly connected edges of the elements the free longitudinal edges will swing upwardly to a position in a higher plane than the hingedly connected edges to give animals access to said troughs.

3. A device of the character set forth, comprising a trough, a cover for the trough embodying pivotally connected sections, a guide rod arranged at each side of the pivotal connection between the cover sections, brackets carried by the cover sections and slidably and pivotally connected with said guide rods to permit the cover to be moved into closed position with its sections inclining downwardly and outwardly and into opened positions with its sections inclining upwardly and outwardly, and means for releasably supporting the cover in closed position.

In testimony whereof I affix my signature.

CLYDE J. McCAUGHEY.